Patented May 11, 1943

2,318,896

UNITED STATES PATENT OFFICE 2,318,896

BIOLOGICALLY ACTIVE COMPOUNDS FOR CONTROLLING PROCREATIVE METABOLISM

Lee Irvin Smith, Minneapolis, Minn., assignor to Regents of the University of Minnesota, Minneapolis, Minn., a corporation of Minnesota No Drawing. Application July 14, 1939, Serial No. 284,455

3 Claims. (Cl. 167—81)

The present invention relates to an improved dietary and medicinal composition for the control of biometabolism, and more particularly, to compositions and mixtures exhibiting the biological effects of naturally occurring substances known as the tocopherols.

According to the work of Evans, Emerson and Emerson, Journal of Biological Chemistry, vol. 113, page 321 (1936), when certain naturally occurring substances are included in the diet, the procreative metabolism of the individual is rendered normal, whereas when the diet does not include these factors the procreative function is inhibited. Thus when properly conditioned female test animals are fed a diet which does not include certain naturally occurring substances, the reproduction is inhibited or completely nullified, whereas when the same animals are returned to a diet including the proper naturally occurring substances, normal reproduction is resumed.

Accumulated evidence has indicated that the ordinary diets of many animals and humans are deficient in naturally occurring biological control factors, and has indicated the necessity of including diet supplement or corrective factors to offset such deficiencies. It has been customary, therefore, to utilize extracts or fractions of naturally occurring substances for such additive diet correction factors in the diets of humans and animals.

The use of naturally occurring compounds for diet corrective purposes has been restricted due to the cost of natural substances, the difficulty encountered in concentrating the active factors without deteriorating them, instability of the concentrate due to rapid oxidation when exposed to air, and many similar difficulties. As a consequence, the use of naturally occurring substances has been restricted.

According to the present invention, dietary control and correction may be accomplished readily and with certainty by the use of certain phenols specifically o-allyl-phenol, or its esters such as the acetate, propionate, palmitate and the like, and it is therefore an object of the present invention to provide a dietary control factor comprising a phenol compound.

More particularly, it is an object of the invention to provide a dietary control factor or medicinal agent comprising o-allyl-phenol or its esters such as the acetate, propionate, palmitate and the like.

It is another object of the present invention to provide a method of diet control involving the use of phenol compound or its esters such as the acetate, propionate, palmitate and the like.

It is also an object of the invention to provide a foodstuff or medicinal agent including a phenol particularly o-allyl-phenol.

According to the present invention, biological control is accomplished by adding to the diet of the individual a regulated dosage of a phenol preferably o-allyl-phenol or its esters.

The biological effectiveness of o-allyl-phenol for influencing biometabolism is illustrated by the action upon test animals. Thus when o-allyl-phenol was fed in 50 mg. doses to standardized conditioned female test rats, litters of live young were produced, thus demonstrating that the phenol compound has the same biological control effect of natural vitamin E. Furthermore, the phenol being stable in air retains its effectiveness over periods of time and is therefore especially desirable for use.

The o-allyl-phenol is an oil at normal temperatures and for controlling biometabolism is added to the ordinary diet, or taken separately as a medicament.

Thus cereal foodstuffs such as granulated grain mixed feeds or dry mash type cattle and poultry feeds may be fortified by the addition of a small portion of the o-allyl-phenol or one of the aforementioned esters, which is mixed into a cereal foodstuff. This is preferably accomplished by first thoroughly mixing about one part of the phenol compound with several parts of cereal to form a concentrate, and then adding and mixing the concentrate with the main body of cereal foodstuff.

Where the diet corrective function may best be carried out by administration of concentrates, it is preferable to form the phenol compound into tablets or enclose it in suitable capsules. In either the tablet or capsule form, the compound may be admixed with a neutral substance such as sodium chloride, calcium carbonate, sugar, lactose, starch or the like, prior to formation into tablet or capsule form.

In some instances, it is desirable to use a fluid concentrate for addition to foodstuffs such as cereal feeds or for direct administration in fluid form. For such modes of utilization the phenol compound may be carried by an oil such as olive oil, edible mineral oil, butter oil, and other similar edible fats and oil, such oils and fats being substantially both physiologically inert and also chemically inert with respect to the o-allyl-phenol.

It is obvious that many variations may be made in the illustrated procedures without departing from the spirit of the invention herein described and claimed.

What is claimed is:

1. A composition for alleviation of conditions resulting from deficiency of vitamin E comprising a compound selected from the group consisting of o-allyl-phenol and fatty acid esters thereof.

2. A composition for alleviation of conditions resulting from deficiency of vitamin E comprising o-allyl-phenol.

3. A composition for controlling procreative metabolism comprising a compound selected from the group consisting of o-allyl-phenol and fatty acid esters thereof admixed with an edible diluent.

LEE IRVIN SMITH.